US008085698B2

(12) United States Patent
Wentink (10) Patent No.: US 8,085,698 B2
(45) Date of Patent: Dec. 27, 2011

(54) PIGGYBACK ACKNOWLEDGEMENT

(75) Inventor: Menzo Wentink, Utrecht (NL)

(73) Assignee: Conexant Systems, Inc., Newport Beach, CA (US)

( * ) Notice: Subject to any disclaimer, the term of this patent is extended or adjusted under 35 U.S.C. 154(b) by 902 days.

(21) Appl. No.: 11/930,723

(22) Filed: Oct. 31, 2007

(65) Prior Publication Data

US 2008/0144558 A1  Jun. 19, 2008

Related U.S. Application Data

(60) Provisional application No. 60/875,733, filed on Dec. 19, 2006.

(51) Int. Cl.
*G08C 17/00* (2006.01)
(52) U.S. Cl. ........................................ 370/311
(58) Field of Classification Search .................. 370/311, 370/328–339, 473–474; 455/13.4, 522, 574, 455/127.1, 127.5; 714/750
See application file for complete search history.

(56) References Cited

U.S. PATENT DOCUMENTS

| | | | | |
|---|---|---|---|---|
| 5,371,734 A * | 12/1994 | Fischer | ............................ | 370/311 |
| 2005/0018624 A1* | 1/2005 | Meier et al. | ..................... | 370/318 |
| 2005/0135295 A1 | 6/2005 | Walton et al. | | |
| 2005/0136913 A1 | 6/2005 | Kampen et al. | | |
| 2006/0252449 A1* | 11/2006 | Ramesh | ......................... | 455/522 |
| 2007/0230408 A1* | 10/2007 | Trainin et al. | .................. | 370/338 |

OTHER PUBLICATIONS

IEEE Std 802.11e, Amendment 8: Medium Access Control Quality of Service Enhancements, 211 pages, 2005.*
IEEE 802.11, Joint Proposal: High throughput extension to the 802.11 Standard: MAC, 104 pages, 2005.*
Xiao, Concatenation and Piggyback Mechanisms for the IEEE 802.11 MAC, IEEE, 6 pages, 2004.*
Xiao, IEEE 802.11 Performance Enhancement via Concatenation and Piggyback Mechanisms, IEEE, 11 pages, 2005.*

* cited by examiner

*Primary Examiner* — Frank Duong
(74) *Attorney, Agent, or Firm* — Jackson Walker L.L.P.; Christopher J. Rourk (57) ABSTRACT

Included are embodiments for facilitating communication. At least one embodiment of a method includes receiving first communication data from a communications device and creating an acknowledgment indicating receipt of the first communication data. Some embodiments include determining whether second communication data has been received for the communications device and in response to determining that data has been received for the communications device, combining the second communication data with the acknowledgement in a single data packet.

33 Claims, 9 Drawing Sheets

PIGGYBACK ACKNOWLEDGEMENT

CROSS REFERENCE

This application claims the benefit of U.S. Provisional Application No. 60/875,733, filed Dec. 19, 2006, which is incorporated by reference in its entirety.

BACKGROUND

As wireless communications have evolved, various protocols have been developed, such as Voice over Internet Protocol (VoIP), Wireless Fidelity (e.g., IEEE 802.11a, 802.11b, 802.11a/b, 802.11n), Wi-Max, and others. While the mobility of wireless devices has been a draw for many users, a wireless power source can be a limiting factor in use of such devices. As many wireless devices utilize wireless power sources, such as batteries, that can only store a limited amount of energy, power conservation techniques are desired for many of these devices.

SUMMARY

Included are embodiments for facilitating communication. At least one embodiment of a method includes receiving first communication data from a communications device and creating an acknowledgment indicating receipt of the first communication data. Some embodiments include determining whether second communication data has been received for the communications device and in response to determining that data has been received for the communications device, combining the second communication data with the acknowledgement in a single data packet.

Also included are embodiments of a system. At least one embodiment of a system includes a receiving component configured to receive first communication data from a communications device and a creating component configured to create an acknowledgment indicating receipt of the first communication device. Some embodiments include a determining component configured to determine whether second communication data has been received for the communications device and a combining component configured to, in response to determining that data has been received for the communications device, combine the second communication data with the acknowledgement in a single data packet.

Also included are embodiments of a computer readable storage medium. At least one embodiment of a computer readable storage medium includes receiving logic configured to receive first communication data from a communications device and creating logic configured to create an acknowledgment indicating receipt of the first communication data, the creating logic further configured to combine the acknowledgement with second communications data in a single data packet. Some embodiments include utilizing logic configured to utilize an IEEE 802.11 protocol power save mechanism to send the data packet to an access point.

Other systems, methods, features, and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Wireless cell phones and/or other wireless client devices may include an option to set up a communications session over an IEEE 802.11 wireless local area network (WLAN) infrastructure. In such a scenario, the voice connection may be set up using Voice over Internet Protocol (VOIP), Universal Mobile Access (UMA) and/or Generic Access Network (GAN). These protocols may be referred to as Voice over Internet Protocol (VoIP) in this disclosure. To increase battery life, a client device or other communications device may also be configured to reduce the number of frames exchanged per VoIP packet. Currently, each data frame that is transmitted using 802.11 Distributed Coordination Function (DCF) may be acknowledged with an acknowledgement frame. Sending or receiving an acknowledgement frame consumes energy at the client device. While the client device can enter a power save state between the VoIP packet exchanges, additional efficiency may be gained, as discussed in more detail below.

Embodiments disclosed herein may be configured to utilize piggyback acknowledgement signaling to reduce the number of frames exchanged per VoIP packet exchange. A typical VoIP flow exchanges an uplink and a downlink voice packet every 20 or 30 milliseconds. A piggyback acknowledgement is a mechanism in which a data frame implicitly acknowledges the successful receipt of a previous data frame. The piggyback acknowledgement frame subtypes are defined in Table 1, where a contention free acknowledgement (+CF-ACK) indicates that the frame subtype has the piggyback acknowledgement property.

TABLE 1

Subtypes of Data type frames that have the piggyback acknowledgement property, as indicated by +CF-ACK

| 10 | Data | 0000 | Data |
|---|---|---|---|
| 10 | Data | 0001 | Data+CF-ACK |
| 10 | Data | 0010 | Data+CF-Poll |
| 10 | Data | 0011 | Data+CF-ACK+CF-Poll |
| 10 | Data | 0100 | Null (no data) |
| 10 | Data | 0101 | CF-ACK (no data) |
| 10 | Data | 0110 | CF-Poll (no data) |
| 10 | Data | 0111 | CF-ACK+CF-Poll (no data) |
| 10 | Data | 1000 | QoS Data |
| 10 | Data | 1001 | QoS Data+CF-ACK |
| 10 | Data | 1010 | QoS Data+CF-Poll |
| 10 | Data | 1011 | QoS Data+CF-ACK+CF-Poll |
| 10 | Data | 1100 | QoS Null (no data) |
| 10 | Data | 1101 | Reserved |
| 10 | Data | 1110 | QoS CF-Poll (no data) |
| 10 | Data | 1111 | QoS CF-ACK+CF-Poll (no data) |
| 11 | Reserved | 0000-1111 | Reserved |

Embodiments of the piggyback acknowledgement frames may be used in combination with power save mechanisms VoIP Aware Power Save (VAP), which is based on PS-Poll, U-APSD and S-APSD.

Figure 1:
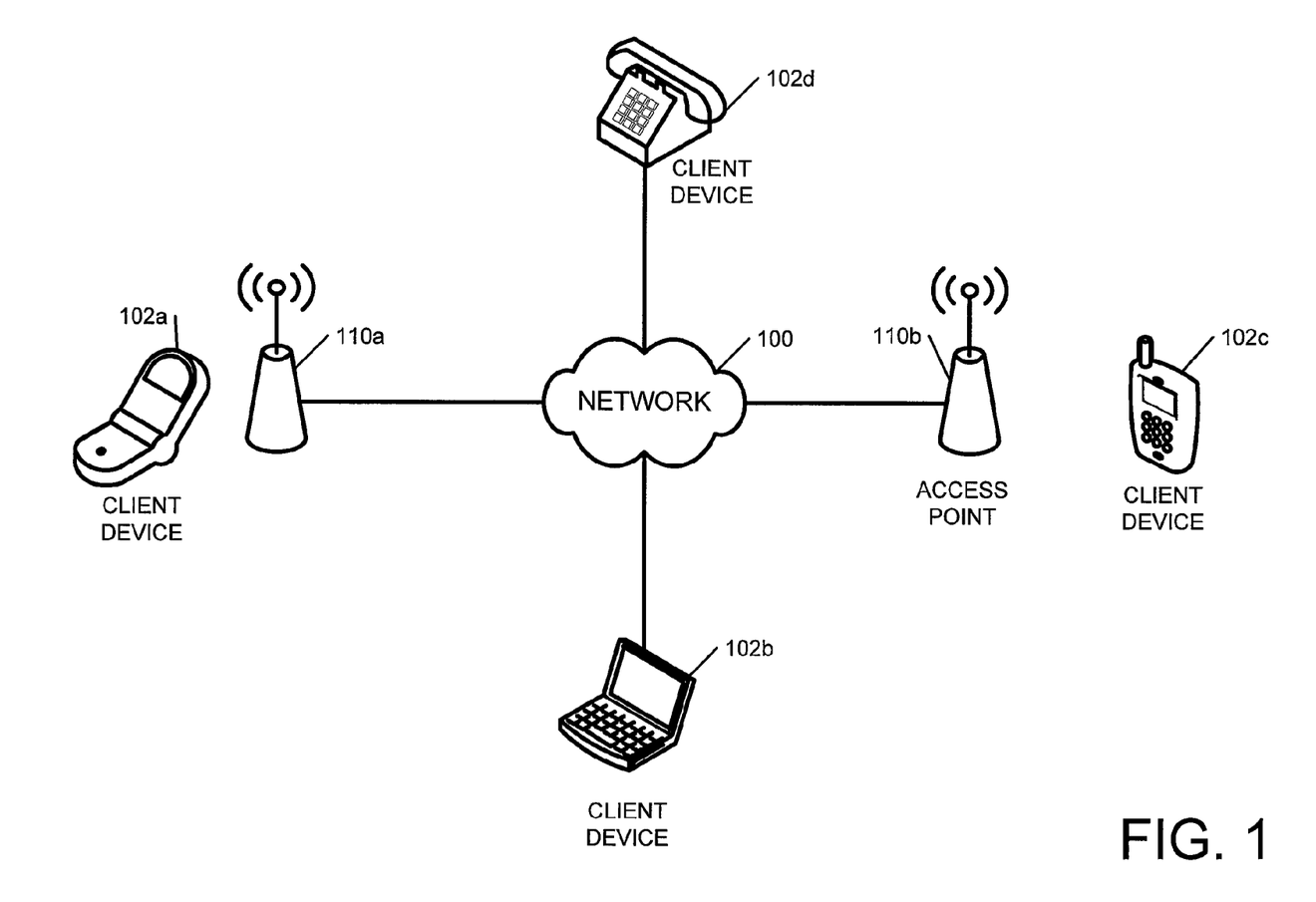
FIG. 1 depicts a diagram illustrating an exemplary embodiment of a network configuration that may be utilized for wireless communications.

FIG. 1 depicts a diagram illustrating an exemplary embodiment of a network configuration that may be utilized for wireless communications. As illustrated in the nonlimiting example from FIG. 1, network 100 may be coupled to access points 110a and 110b or other communications devices. Access points 110a and 110b can be configured to provide wireless communications to client devices 102a, 102b, 102c and/or 102d. More specifically, depending on the particular configuration, access points 110a and/or 110b may be configured for providing Voice Over Internet Protocol (VoIP) services, WI-FI services, WiMAX services, wireless SIP services, Bluetooth services and/or other wireless communication services.

The network 100 may include a Public Switched Telephone Network (PSTN), a Voice over Internet Protocol (VoIP) network, an Integrated Services Digital Network (ISDN), the Internet, a cellular network, and/or other mediums for communicating data between communication devices. More specifically, while the client devices 102a and 102b may be configured for WI-FI communications, a client devices 102c and 102d may be coupled to the network 100 and may be configured for VoIP communications, Bluetooth communications, WI-FI communications, and/or other wireline and/or wireless communications.

Figure 2A:
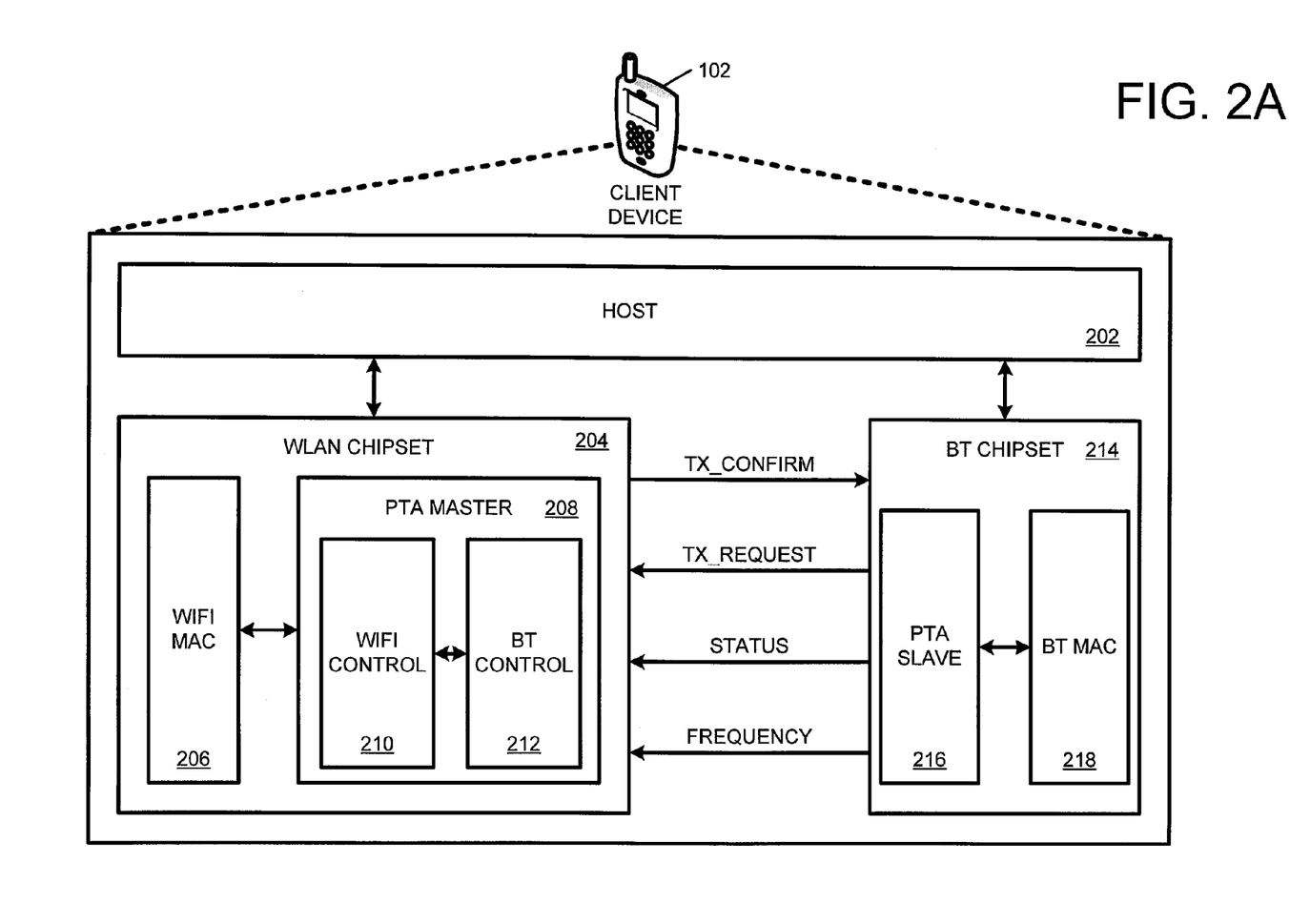
FIG. 2A depicts a diagram illustrating an exemplary embodiment of a client device that may be configured to operate in the network from FIG. 1.

FIG. 2A depicts a diagram illustrating an exemplary embodiment of a client device that may be configured to operate in the network from FIG. 1. As illustrated in the nonlimiting example of FIG. 2A, the client device 102 may include a host 202. Additionally included is a Wireless Local Area Network (WLAN) chipset 204, which may include a WI-FI Media Access Control (MAC) and a Packet Traffic Arbitration (PTA) master 208. The PTA master 208 can include a WI-FI control component 210 and a Bluetooth (BT) control component 212.

Also included with the client device 102 is a Bluetooth chipset 214. The Bluetooth chipset 214 may include a PTA slave component 218 and a Bluetooth MAC component 218. The WLAN chipset 204 and the BT chipset 214 may be configured to communicate data signals to coordinate various protocols such as 802.11 data and Bluetooth data. At least a portion of the signals are included in Table 2, below.

TABLE 2

Signals communicated in a client device 102

| Pin name | Data direction | Description |
|---|---|---|
| Tx_request | BT to WLAN | May be asserted during BT receive or transmit. On receipt of a tx_request signal, the 802.11 control may generate a tx_confirm signal containing a status value that is either allowed or denied. |
| Status | BT to WLAN | Pulsed if a BT slot is high priority. After pulsing, indicates BT radio mode (transmit or receive). |
| Tx_confirm | WLAN to BT | Transmission confirmation. De-asserted when the PTA modules attempt to prevent the BT module transmission. The BT module may not initiate a transmission when the tx_confirm is de-asserted, as sampled before the start of the slot, but may continue transmission if asserted during the slot. In response to a tx_request signal, Bluetooth control may generate a tx_confirm signal that includes a status value that is either allowed or denied. |
| Frequency | BT to WLAN | This optional frequency overlap signal is asserted when the BT transceiver hops into restricted channels that are defined by a coexistence mechanism. |

In operation, the BT chipset 214 may send a tx_request to the PTA master 208, indicating a request to transmit Bluetooth data. The PTA master 208 can respond with an indication to transmit or to refrain from transmitting at this time (e.g., tx_confirm). The Bluetooth data may then be transmitted. A status signal may be sent from the BT chipset 214 to the PTA master 204 if the data to be transmitted is determined to be high priority data. Additionally, as discussed in more detail below, the client device 102 may also be configured for dynamic fragmentation, delayed transmission, and/or other actions, depending on the particular configuration.

One should also note that, while not explicitly illustrated in FIG. 2A, client device 102 may include other components, such as a processor, display interface, input interface, output interface, data storage, local interface (e.g., a bus), one or more memory components, such as RAM, DRAM, flash memory, and/or other volatile and nonvolatile memory components. Additionally, the client device 102 may include one or more programs (embodied in software, hardware, firmware, etc.) for execution by the processor. The programs may be located with the memory components, data storage, and/or elsewhere. Other components may be included that facilitates communication of data with the client device 102.

One should also note that components illustrated in FIG. 2A are illustrated for purposes of illustration and are not intended to limit the scope of this disclosure. More specifically, while PTA master 208 is illustrated as residing in the WLAN chipset 204, this is a nonlimiting example. More specifically, in at least one embodiment, the PTA master 208 may reside on an Application Specific Integrated Circuit (ASIC), at the host, and/or elsewhere. Similarly, other components described with respect to the client device 102 may differ in practice, depending on the particular configuration.

One should also note that while the logic in FIG. 2A is depicted as hardware, this is also a nonlimiting example, as one or more components may be utilized as hardware, software, and/or firmware. Additionally, as discussed above, the client device 102 may be configured for 802.11 communications, as well as VoIP communications.

Figure 2B:
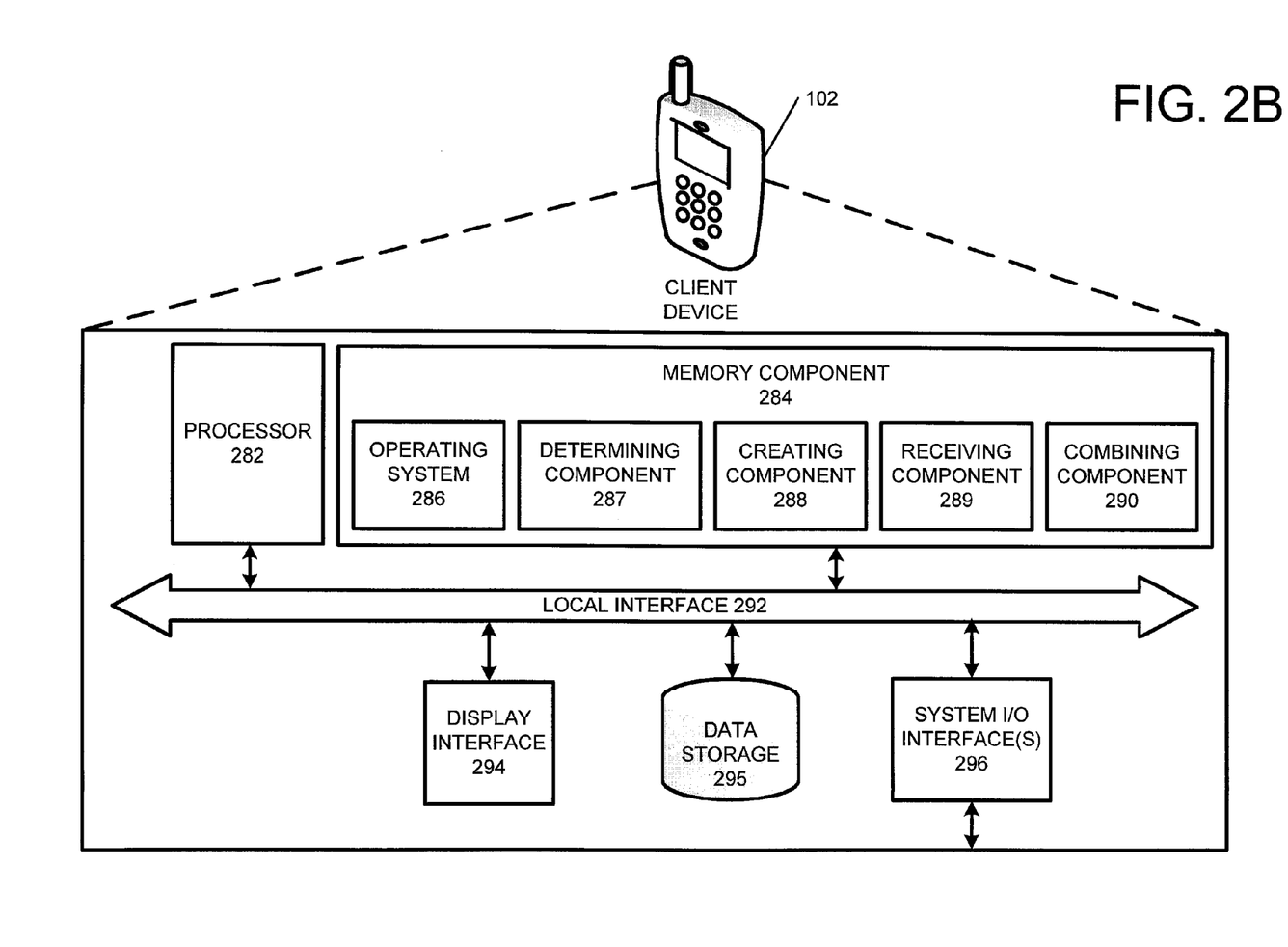
FIG. 2B depicts an additional diagram illustrating an exemplary embodiment of a client device that may include one or more components for operating, similar to the diagram from FIG. 2A.

FIG. 2B depicts an additional diagram illustrating an exemplary embodiment of a client device that may include one or more components for operating, similar to the diagram from FIG. 2A. As illustrated in the nonlimiting example, FIG. 2B may include a processor 282, which may be coupled to a local interface 292. The local interface 292 may also be coupled to a display interface 294, a data storage device 295, and a system input/output interface(s) component 296. The local interface may also be coupled to a memory component 284.

Memory component 284 may include volatile and/or nonvolatile memory components. As a nonlimiting example, the memory component 284 may include an operating system 286, a determining component 287, a creating component 288, a receiving component 289, and a combining component 290. More specifically, the receiving component 289 may be configured to receive first communication data from a communications device. The creating component 288 may be configured to create an acknowledgment indicating receipt of the first communication data. The determining component 287 configured to determine whether second communication data has been received for the communications device. The combining component 290 may be configured to, in response to determining that data has been received for the communications device, combine the second communication data with the acknowledgement in a single data packet. Additionally, other components may be included for sending the combined second communication data and acknowledgement to the communications device, for, in response to determining that the second communication data has not been received, sending the acknowledgement to the communications device, and/ or for other functions.

Figures 3A, 3B:
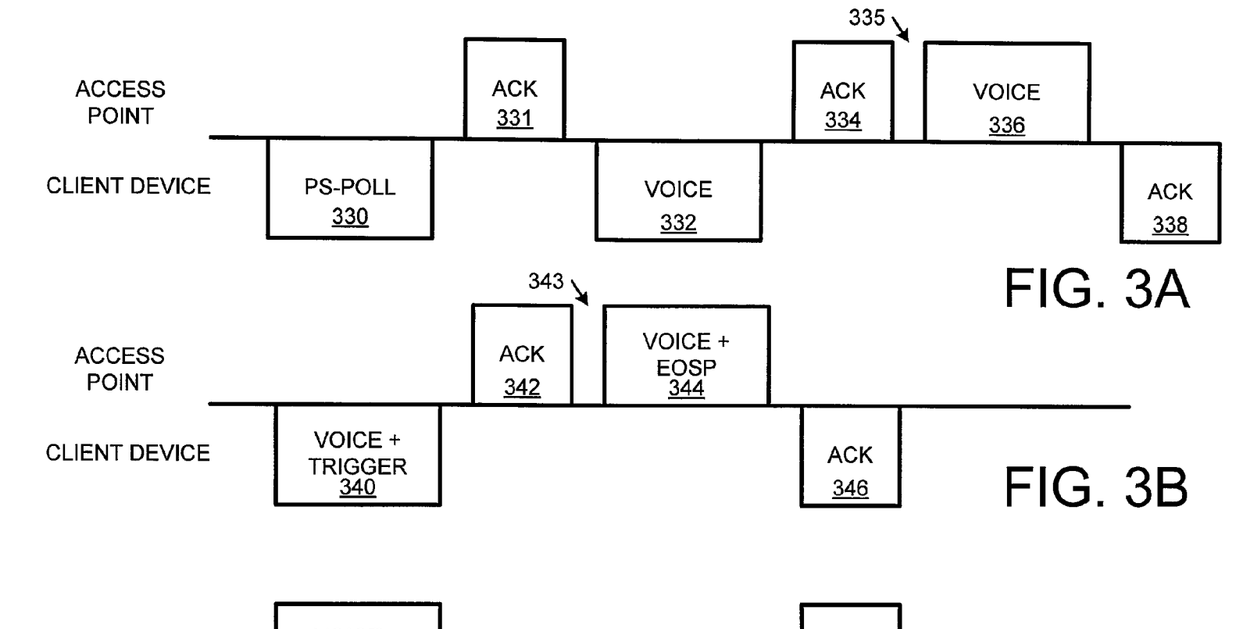
FIG. 3A depicts a block diagram illustrating an exemplary embodiment of the utilization of a Voice Aware Power Save (VAP) function, as may be utilized in the network from FIG. 1.
FIG. 3B depicts a block diagram illustrating an exemplary embodiment of the utilization of an Unscheduled Asynchronous Power Save Delivery (U-APSD) function, similar to the diagram of FIG. 3A.

FIG. 3A depicts a block diagram illustrating an exemplary embodiment of the utilization of a Voice Aware Power Save (VAP) function, as may be utilized in the network from FIG. 1. As illustrated in the nonlimiting example of FIG. 3A, the client device 102 may be configured to communicate in a VoIP and/or Wi-Fi protocol and may be configured to send a power save poll (PS-Poll) 330 to the access point 110. More specifically, the client device 102 may inquire whether the access point 110 is currently buffering data for the client device 102. The buffered data may include voice data, video data, image data, and/or other types of data. Upon making a determination that data may be buffered at the access point 110, the client device 102 can send a PS-Poll 330 for retrieving the data. The access point 110 can receive the PS-Poll 330 and send an acknowledgement 331 back to the client device 102.

The client device 102 can send voice data 332 to the access point 110. The access point 110 can receive the voice data 332 and send an acknowledgement 334 back to the client device 102. The access point 110 can then, after a delay 335, send voice data 336. Upon receiving the voice data 336, the client device 102 can send an acknowledgement 338. As illustrated in FIG. 3A, such a configuration may inefficiently utilize power for at least the reason that the client device 102 may be active during the entire time from the sending of the PS-Poll to the sending of the acknowledgement 338.

FIG. 3B depicts a block diagram illustrating an exemplary embodiment of the utilization of an Unscheduled Asynchronous Power Save Delivery (U-APSD) function, similar to the diagram of FIG. 3A. As illustrated in the nonlimiting example of FIG. 3B the client device 102 can send voice (and/or other) data in the same packet and/or frame as a trigger 340. The voice data may be part of the data payload, while the trigger may be configured to indicate a U-APSD. More specifically, the trigger may be configured as an uplink data frame with a bit in the Media Access Control (MAC) header that indicates that U-APSD is being utilized.

Upon receiving the voice and trigger data 340, the access point 110 can respond with an acknowledgement 342. After a delay 343, the access point 110 can send voice data and an end of service period (EOSP) bit 344. The EOSP bit may be configured to indicate that the service period has ended and that the client device 102 can return to a power save mode, where at least one of the active components utilized during normal operation is deactivated during a period of communicative inactivity. The client device 102 can send an acknowledgement 346 and enter power save mode, as indicated by the EOSP bit.

Figure 3C:
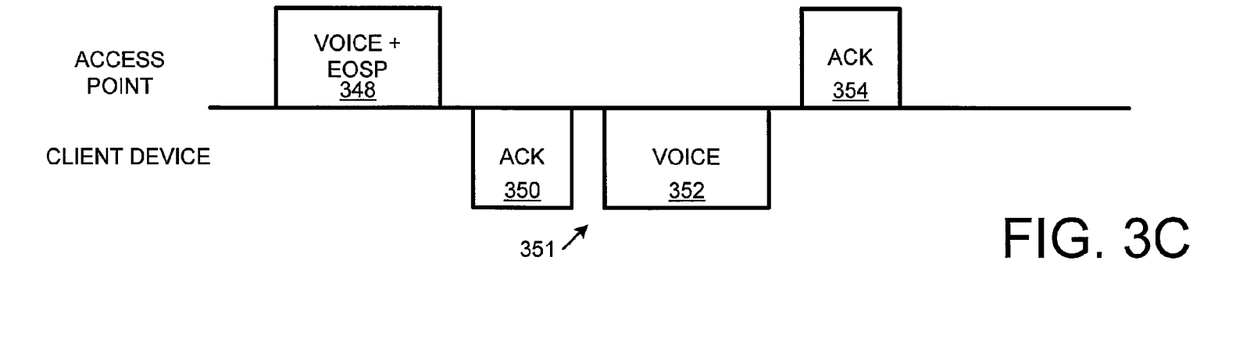
FIG. 3C depicts a block diagram illustrating an exemplary embodiment of the utilization of a Scheduled Asynchronous Power Save Delivery (S-APSD) function, similar to the diagram from FIG. 3B.

FIG. 3C depicts a block diagram illustrating an exemplary embodiment of the utilization of a Scheduled Asynchronous Power Save Delivery (S-APSD) function, similar to the diagram from FIG. 3B. As illustrated in the nonlimiting example of FIG. 3C, the access point 110 can send voice data and an EOSP bit 348 to the client device 102. The client device 102 can send an acknowledgement 350 and after a delay 351, can send voice data 352. The access point 110 can receive the voice data and respond with an acknowledgement 354.

As discussed above, the nonlimiting examples of FIGS. 3A-3C indicate that voice data 336, 344, and 352 is sent at some point after sending an acknowledgement 334, 342, and 350. While such a configuration may provide the desired data, in at least one embodiment, such a configuration may facilitate the inefficient utilization of device power.

Figure 4A:
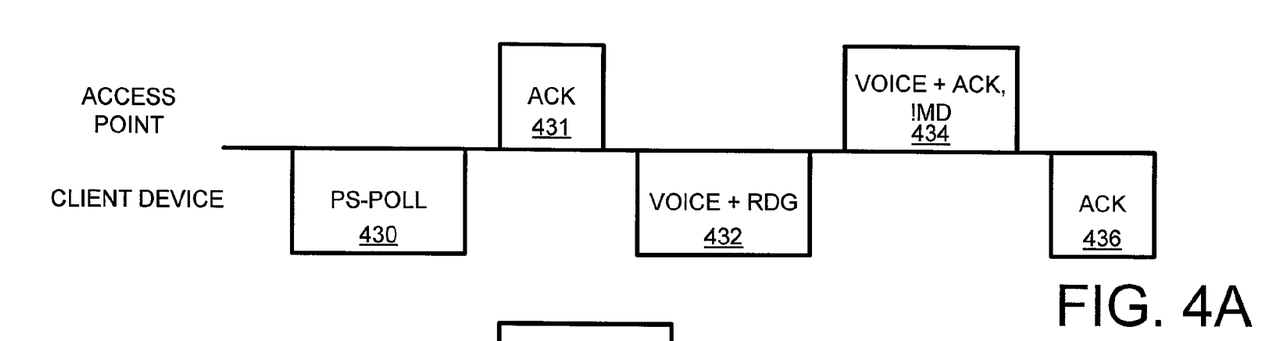
FIG. 4A depicts a block diagram illustrating an exemplary embodiment of utilizing a piggyback acknowledgement, with a VAP function, such as may be utilized in the network from FIG. 1.

FIG. 4A depicts a block diagram illustrating an exemplary embodiment of utilizing a piggyback acknowledgement, with a VAP function, such as may be utilized in the network from FIG. 1. As illustrated in the nonlimiting example of FIG. 4A, the client device 102 can send a PS-Poll 430 to the access point 110. The access point 110 can receive the data and send an acknowledgement 431 back to the client device 102. Additionally, the client device 102 can send voice data and a Reverse Direction Grant (RDG) bit 432. The RDG bit may be configured to indicate to the access point 110 that, if there is payload data (e.g., voice data, video, image, audio, etc.), the payload data may be sent with an acknowledgement to receiving the voice data 432. The RDG may be of sufficient duration for the voice frame 434 to be transmitted. The access point 110 can respond after a short interface frame (SIFS) delay, with voice data, an acknowledgement, and a "no more data" (!MD) bit 434. As illustrated, the data 434 can be sent in a single transmission packet. Upon receiving this data, the client device 102 can send an acknowledgement 436 and return to sleep mode.

Figure 4B:
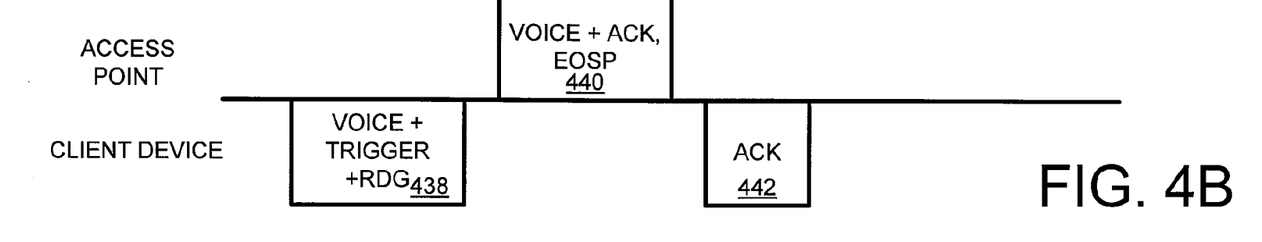
FIG. 4B depicts a block diagram illustrating an exemplary embodiment of utilizing a piggyback acknowledgement with a U-APSD function, similar to the diagram of FIG. 4A.

FIG. 4B depicts a block diagram illustrating an exemplary embodiment of utilizing a piggyback acknowledgement with a U-APSD function, similar to the diagram of FIG. 4A. As illustrated in the nonlimiting example of FIG. 4B, the client device 102 can send an uplink voice frame in an access category, which is trigger enabled, with RDG data 438 of sufficient duration for the downlink voice frame 440. After a SIFS, the access point 110 can respond with voice data, an acknowledgement, and an EOSP bit 440 in a single packet, when no more data is buffered at the access point 110. The client device 102 can respond with an acknowledgement 442. The client device 102 can then return to sleep mode.

Figure 4C:
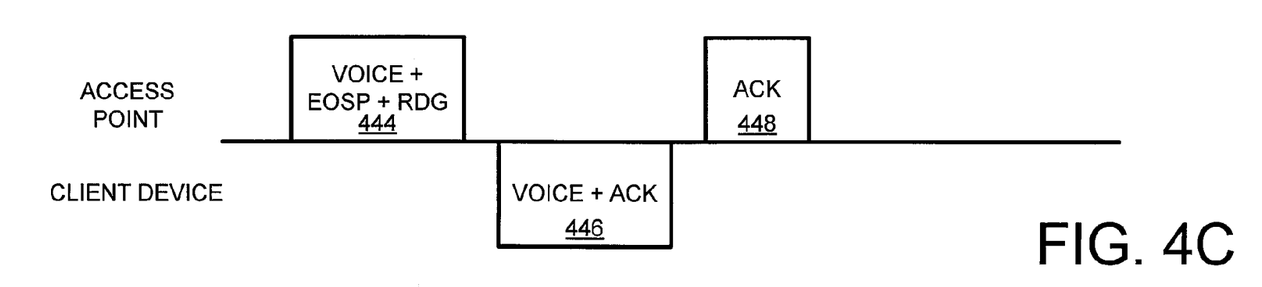
FIG. 4C depicts a block diagram illustrating an exemplary embodiment of utilizing a piggyback acknowledgement with a S-APSD function, similar to the diagram from FIG. 4B.

FIG. 4C depicts a block diagram illustrating an exemplary embodiment of utilizing a piggyback acknowledgement with a S-APSD function, similar to the diagram from FIG. 4B. As illustrated in the nonlimiting example of FIG. 4C, the access point 110 can send voice data, an EOSP bit (when no ore traffic is buffered at the access point) and an RDG bit 444 in a single packet. The client device 102 can send voice data with an acknowledgement piggybacked in the same packet 446. The access point 110 can respond with an acknowledgment 448. The client device 102 can then return to sleep mode.

As illustrated in the nonlimiting examples of FIGS. 4A-4C, by piggybacking payload data with the acknowledgement, more efficient use of client device 102 power may be utilized. More specifically, by combining payload data with an acknowledgement, the data can be communicated in less time and with fewer packets and/or frames, thereby allowing the client device 102 to enter a power saving mode sooner and for a longer amount of time.

Figure 5:
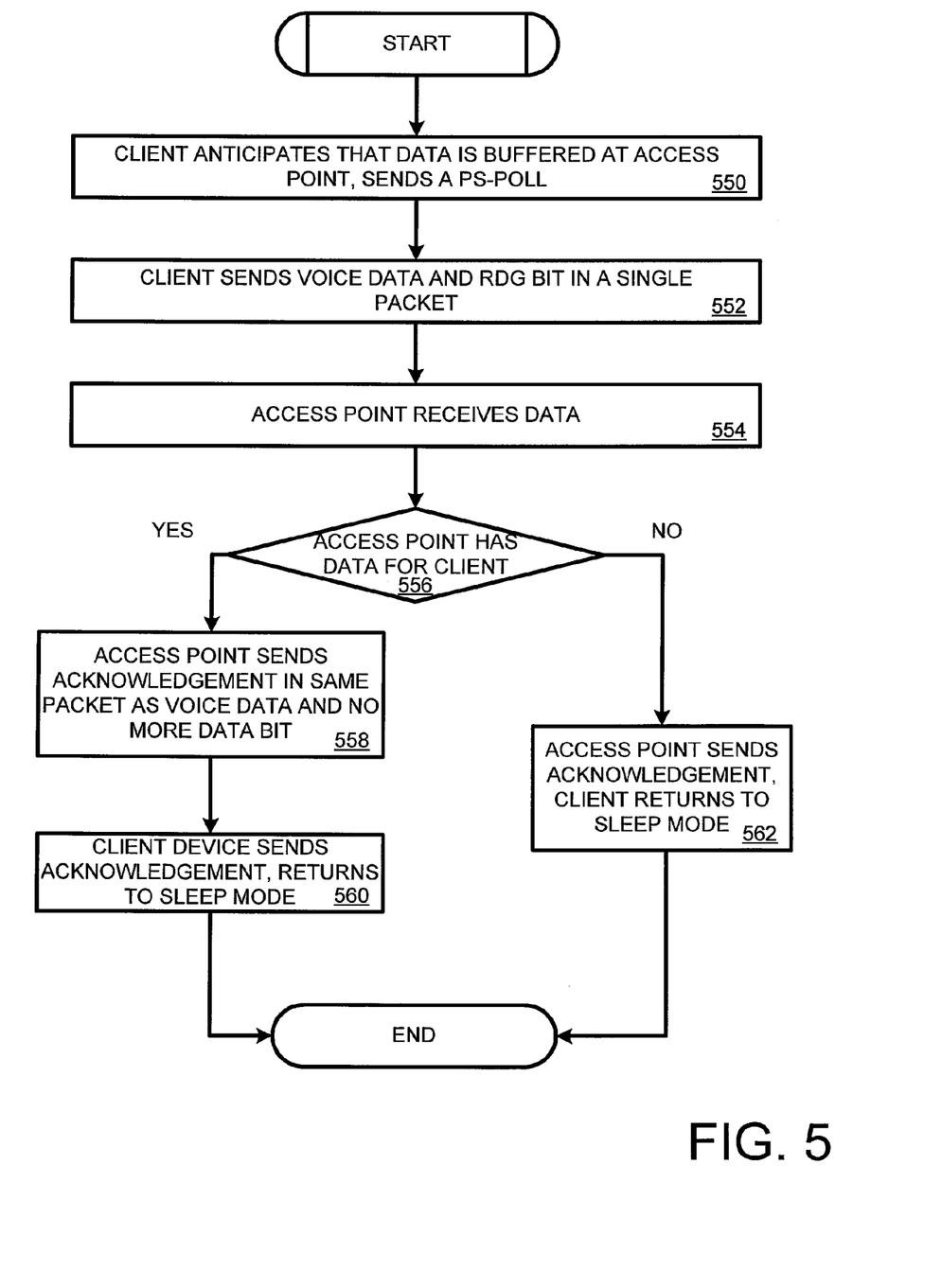
FIG. 5 depicts a flowchart illustrating an exemplary process for utilizing a piggyback acknowledgement with a VAP function, similar to the diagram from FIG. 4A.

FIG. 5 depicts a flowchart illustrating an exemplary process for utilizing a piggyback acknowledgement with a VAP function, similar to the diagram from FIG. 4A. As illustrated in the nonlimiting example of FIG. 5, the client device 102 can determine whether data is buffered at the access point 110 and can send a PS-Poll (block 550). The client device 102 can then send voice data and an RDG bit in a single packet to the access point 110 (block 552). The access point 110 can receive the data (block 554). The access point can determine whether there is data to be sent to the client device 102 (block 556). If there is data to send to the client, the access point 110 can send an acknowledgement in the same packet as a voice data and can also send a no more data bit in that packet (block 558). The client device 102 can receive the data, can send an acknowledgment, and can return to a sleep mode (block 560). If, on the other hand, there is no data to send to the client device 102, the access point 110 can send the acknowledgement. The client device 102 can receive the acknowledgement and return to sleep mode (block 562).

One should note that, while not explicitly indicated in FIG. 5, depending on the particular configuration the access point 110 can send a null frame that indicates no more data at block 562. The null frame may indicate that the client device 102 may return to sleep mode, however, this is not a requirement.

Figure 6:
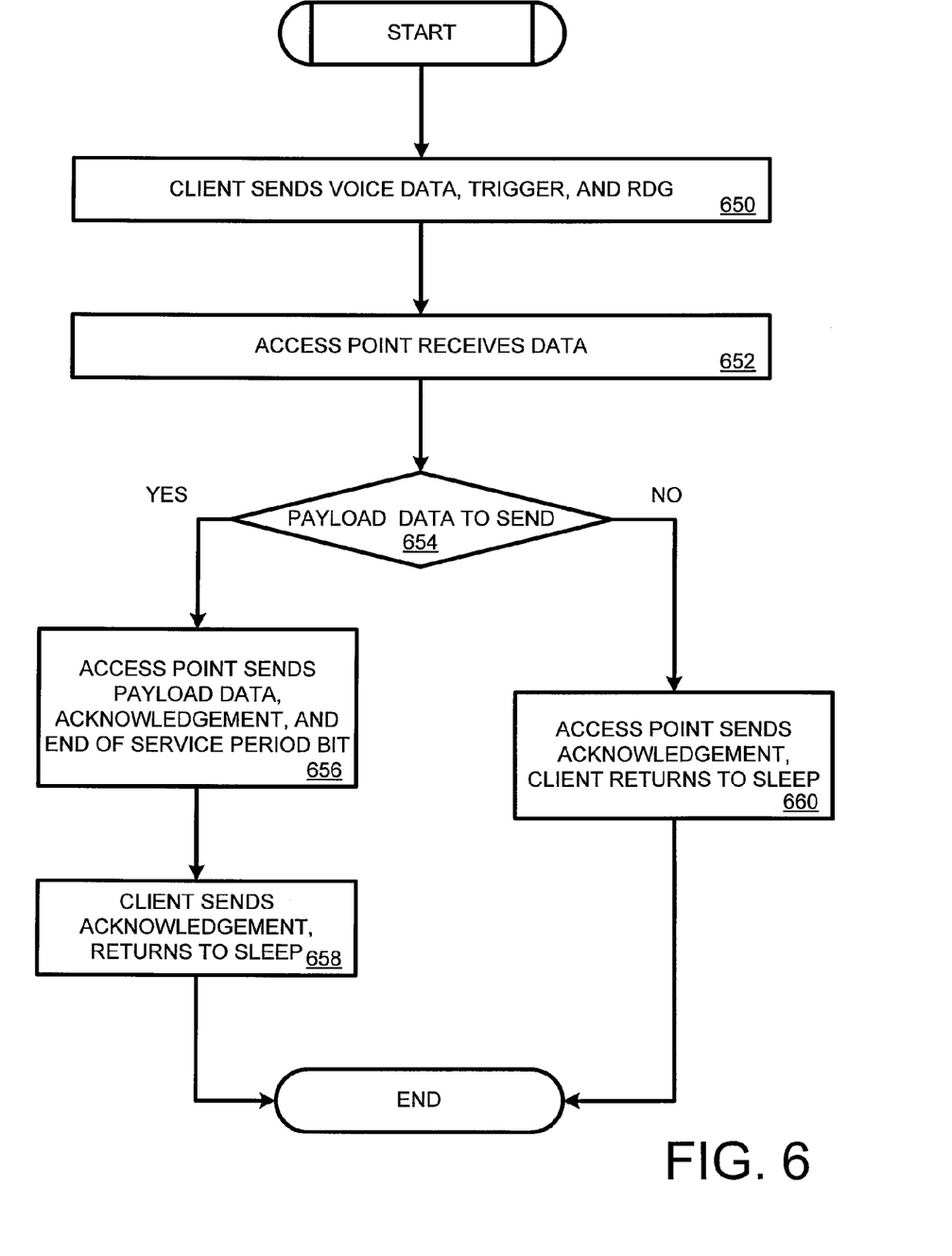
FIG. 6 depicts a flowchart illustrating an exemplary process for utilizing a piggyback acknowledgement with a U-APSD function, similar to the diagram from FIG. 4B.

FIG. 6 depicts a flowchart illustrating an exemplary process for utilizing a piggyback acknowledgement with a U-APSD function, similar to the diagram from FIG. 4B. As illustrated in the nonlimiting example of FIG. 6, the client device can send voice data, a trigger and an RDG (block 650). As discussed above, the trigger may be configured to indicate that a U-APSD exchange will occur. Similarly, the RDG bit may be configured to indicate that, if payload data is to be sent back to the client device 102, that payload data may be sent with the acknowledgment for the received data.

The access point 110 can then determine whether there is payload data to send to the client device 102 (block 654). If there is payload data to send, the access point 110 can send the payload data, acknowledgement, and end of service period bit (block 656). The client device 102 can receive the data, send an acknowledgement, and return to sleep mode (block 658). If, on the other hand, there is no payload for the access point 110 to send, the access point can send the acknowledgement. The client device 102 can receive the acknowledgement and return to sleep mode (block 660).

One should note that, while not explicitly indicated in FIG. 6, depending on the particular configuration the access point 110 can send a null frame that indicates no more data at block 660. The null frame may indicate that the client device 102 may return to sleep mode, however, this is not a requirement.

Figure 7:
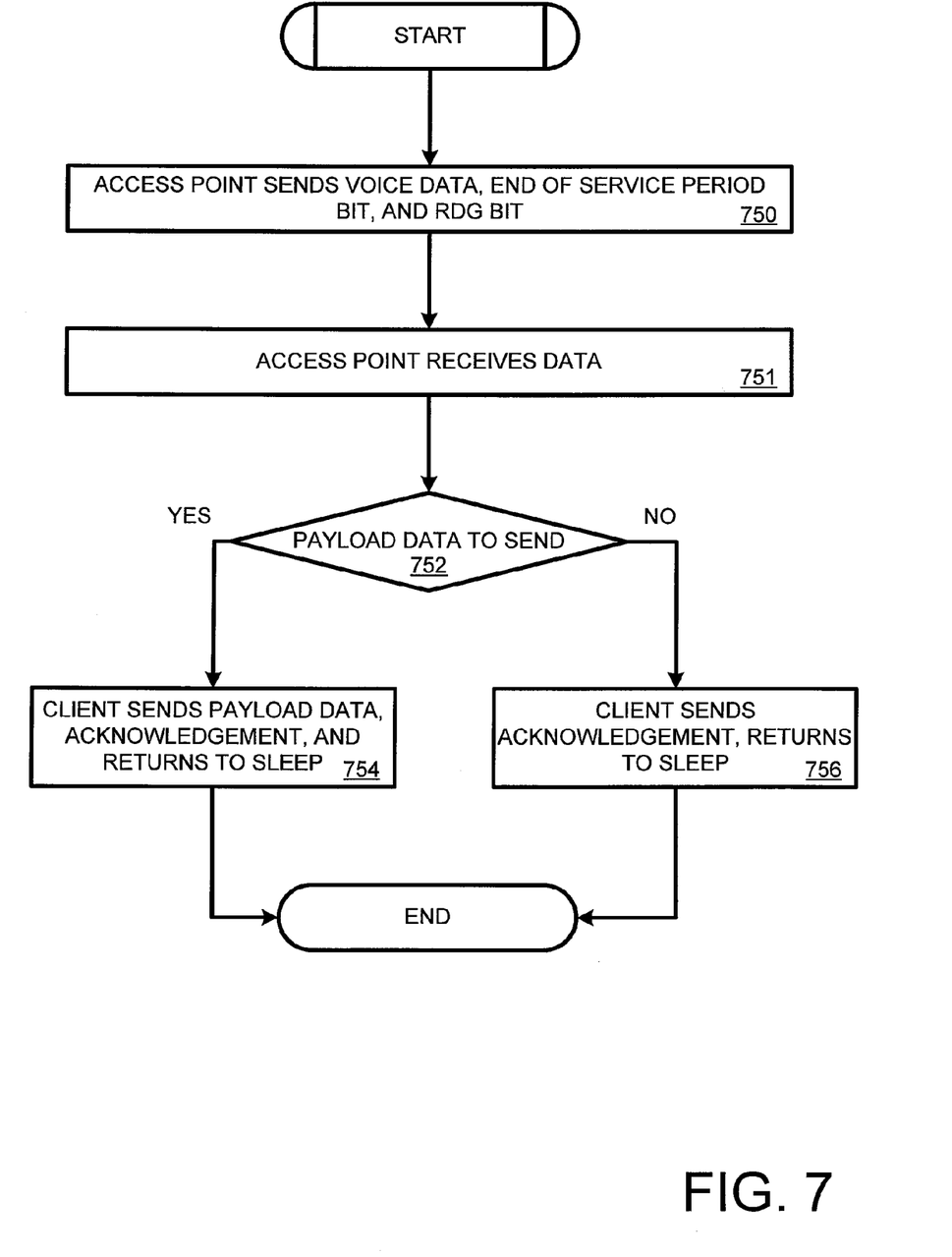
FIG. 7 depicts a flowchart illustrating an exemplary process for utilizing a piggyback acknowledgement with a S-APSD function, similar to the diagram from FIG. 4C.

FIG. 7 depicts a flowchart illustrating an exemplary process for utilizing a piggyback acknowledgement with a S-APSD function, similar to the diagram from FIG. 4C. As illustrated in the nonlimiting example of FIG. 7, the access point 110 can send payload data, an end of service period bit, and an RDG bit (block 750). The access point 110 can receive the data (block 751). The client device 102 can then determine whether there is payload data to send back to the access point 110 (block 752). If there is payload data to send back to the access point 110, the client device 102 can send the payload data and the acknowledgement in a single packet and return to sleep mode (block 754). If, on the other hand, there is no payload data to send to the access point 110, the client device 102 can send the acknowledgement and return to sleep mode (block 756).

Figure 8:
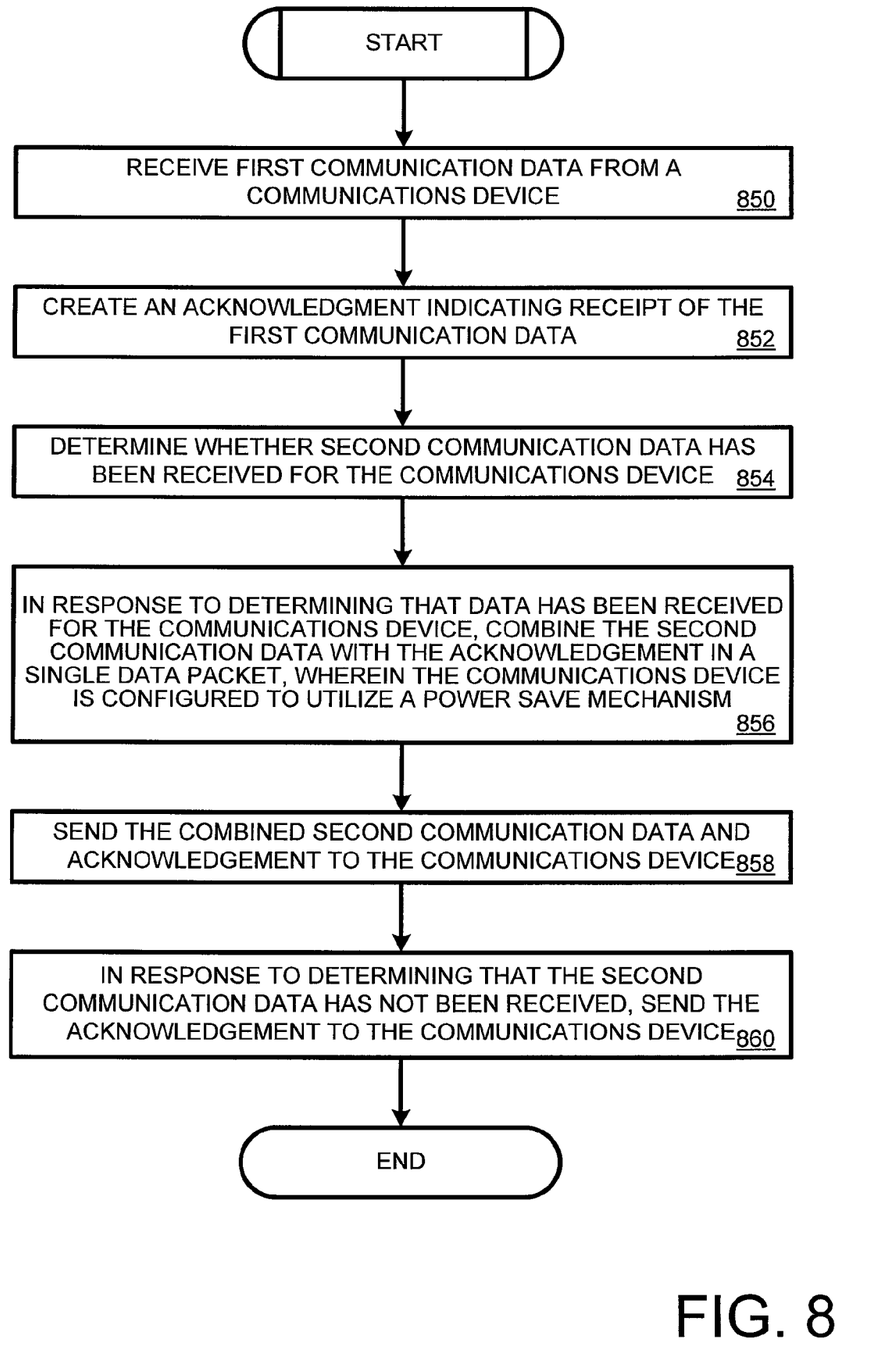
FIG. 8 depicts a flowchart illustrating an exemplary process for piggybacking data with an acknowledgement, similar to the flowchart from FIG. 7.

FIG. 8 depicts a flowchart illustrating an exemplary process for piggybacking data with an acknowledgement, similar to the flowchart from FIG. 7. As illustrated in the nonlimiting example of FIG. 8, the communications device 102 can receive first communications data from another communications device (block 850). The other communications device may include a communications device 102, and access point 110, and/or other device for facilitating the communication of data. The communications device 102 can create an acknowledgement indicating receipt of the first communications data (block 852). The communications device 102 can determine whether second communications data has been received from the another communications device (block 854). The communications device 102 can, in response to determining that data has been received for the another communications device, combine the second communications data with the acknowledgement in a single data packet, wherein the communications device is configured to utilize a power save mechanism (block 856). The communications device 102 can send the combined second communications data and acknowledgement to the communications device (block 858). The communications device 102 can, in response to determining that the second communications data has not been received, send the acknowledgment to the another communications device (block 860).

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks might occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A method for facilitating communication, comprising:
   receiving first communication data from a communications device;
   creating an acknowledgment indicating receipt of the first communication data;
   determining whether second communication data has been received for the communications device; and
   in response to determining that data has been received for the communications device, combining the second communication data with the acknowledgement in a single data packet and sending the combined second communication data and acknowledgement to the communications device, wherein the communications device is configured to utilize a power save mechanism.

2. The method of claim 1, further comprising, in response to determining that the second communication data has not been received, sending the acknowledgement to the communications device.

3. The method of claim 1, wherein the communications device is configured to communicate in a Voice over Internet Protocol (VoIP) environment.

4. The method of claim 1, wherein the first communication data is sent with a reverse direction grant (RDG) bit, the RDG bit configured to indicate permission to send the second communication data, if received, in a single packet with the acknowledgement.

5. The method of claim 4, wherein the first communication data is sent as a trigger frame.

6. The method of claim 5, wherein the second communication data is sent with an End of Service Period (EOSP) bit configured to indicate an end of a service period.

7. The method of claim 5, wherein the first communication data is sent with an End of Service Period (EOSP) bit configured to indicate an end of a service period.

8. The method of claim 1, wherein receiving the first communication data is preceded by receiving a PS-Poll.

9. The method of claim 1, wherein the second communication data is sent with a no More Data (!MD) bit, the MD bit configured to indicate that no more data will be sent.

10. The method of claim 1, wherein the method utilizes a Voice over Internet Protocol (VoIP) Aware Powersave (VAP) function.

11. The method of claim 1, wherein the method utilizes a Scheduled Asynchronous Power Save Delivery (S-APSD) function.

12. The method of claim 1, wherein the method utilizes an Unscheduled Asynchronous Power Save Delivery (U-APSD) function.

13. A system for facilitating communication, comprising:
    memory having instructions stored thereon;
    a receiving component configured by the instructions to receive first communication data from a communications device;
    a creating component configured by the instructions to create an acknowledgment indicating receipt of the first communication data;
    a determining component configured by the instructions to determine whether second communication data has been received for the communications device;
    a combining component, configured by the instructions to, in response to determining that data has been received for the communications device, combine the second communication data with the acknowledgement in a single data packet, wherein the system is configured to utilize a power save mechanism; and
    a first sending component configured by the instructions to send the combined second communication data and acknowledgement to the communications device.

14. The system of claim 13, further comprising, a second sending component configured by the instructions to, in response to determining that the second communication data has not been received, send the acknowledgement to the communications device.

15. The system of claim 13, wherein the communications device is configured to communicate in a Voice over Internet Protocol (VoIP) environment.

16. The system of claim 13, wherein the first communication data is sent with a reverse direction grant (RDG) bit, the RDG bit configured to indicate permission to send the second communication data, if received, in a single packet with the acknowledgement.

17. The system of claim 13, wherein the system utilizes a Scheduled Asynchronous Power Save Delivery (S-APSD) function.

18. The system of claim 13, wherein the system utilizes an Unscheduled Asynchronous Power Save Delivery (U-APSD) function.

19. The system of claim 13, wherein the system utilizes a Voice over Internet Protocol (VoIP) Aware Powersave (VAP) function.

20. A computer readable storage non-transitory medium with logic stored thereon for facilitating communication, comprising:
receiving logic configured to receive first communication data;
creating logic configured to create an acknowledgment indicating receipt of the first communication data, the creating logic further configured to combine the acknowledgement with second communications data in a single data packet and send the combined second communication data and acknowledgement; and
utilizing logic configured to utilize an IEEE 802.11 protocol power save mechanism.

21. The computer readable storage medium of claim 20, wherein the power save mechanism includes at least one of the following: Voice over Internet Protocol (VoIP) Aware Power Save (VAP), Unscheduled Asynchronous Power Save Delivery (U-APSD), and Scheduled Asynchronous Power Save Delivery (S-APSD).

22. A system, comprising:
means for receiving first communication data from a communications device;
means for creating an acknowledgment indicating receipt of the first communication data;
means for determining whether second communication data has been received for the communications device; and
means for combining the second communication data with the acknowledgement in a single data packet and sending the combined second communication data and acknowledgement to the communications device in response to determining that data has been received for the communications device, wherein the communications device is configured to utilize a power save mechanism.

23. The system of claim 22, further comprising means for sending the acknowledgement to the communications device in response to determining that the second communication data has not been received.

24. The system of claim 22, wherein the communications device is configured to communicate in a Voice over Internet Protocol (VoIP) environment.

25. The system of claim 22, wherein the first communication data is sent with a reverse direction grant (RDG) bit, the RDG bit configured to indicate permission to send the second communication data, if received, in a single packet with the acknowledgement.

26. The system of claim 25, wherein the first communication data is sent as a trigger frame.

27. The system of claim 26, wherein the second communication data is sent with an End of Service Period (EOSP) bit configured to indicate an end of a service period.

28. The system of claim 25, wherein the first communication data is sent with an End of Service Period (EOSP) bit configured to indicate an end of a service period.

29. The system of claim 22, wherein receiving the first communication data is preceded by receiving a PS-Poll.

30. The system of claim 22, wherein the second communication data is sent with a no More Data (!MD) bit, the MD bit configured to indicate that no more data will be sent.

31. The system of claim 22, wherein the system utilizes a Voice over Internet Protocol (VoIP) Aware Powersave (VAP) function.

32. The system of claim 22, wherein the system utilizes a Scheduled Asynchronous Power Save Delivery (S-APSD) function.

33. The system of claim 22, wherein the system utilizes an Unscheduled Asynchronous Power Save Delivery (U-APSD) function.

* * * * *

UNITED STATES PATENT AND TRADEMARK OFFICE
CERTIFICATE OF CORRECTION

Page 1 of 1

PATENT NO.       : 8,085,698 B2
APPLICATION NO.  : 11/930723
DATED            : December 27, 2011
INVENTOR(S)      : Menzo Wentink It is certified that error appears in the above-identified patent and that said Letters Patent is hereby corrected as shown below:

Column 10, line 14, claim 3, replace "(Vo1P)" with "(VoIP)"

Column 10, line 34, claim 10, replace "(Vo1P)" with "(VoIP)"

Column 11, line 3, claim 15, replace "(Vo1P)" with "(VoIP)"

Column 11, line 16, claim 19, replace "(Vo1P)" with "(VoIP)"

Column 11, line 33, claim 21, replace "(Vo1P)" with "(VoIP)"

Column 12, line 15, claim 24, replace "(Vo1P)" with "(VoIP)"

Column 12, line 35, claim 31, replace "(Vo1P)" with "(VoIP)"

Signed and Sealed this
Twenty-eighth Day of February, 2012

David J. Kappos
*Director of the United States Patent and Trademark Office*